Dec. 21, 1965       H. U. KLIPPERT         3,224,266
        TESTING APPARATUS FOR DETERMINING RESISTANCE
                    TO WEATHER INFLUENCES
Filed June 7, 1962                    12 Sheets-Sheet 1

INVENTOR.
Hans Ulrich Klippert
BY
Michael S. Striker

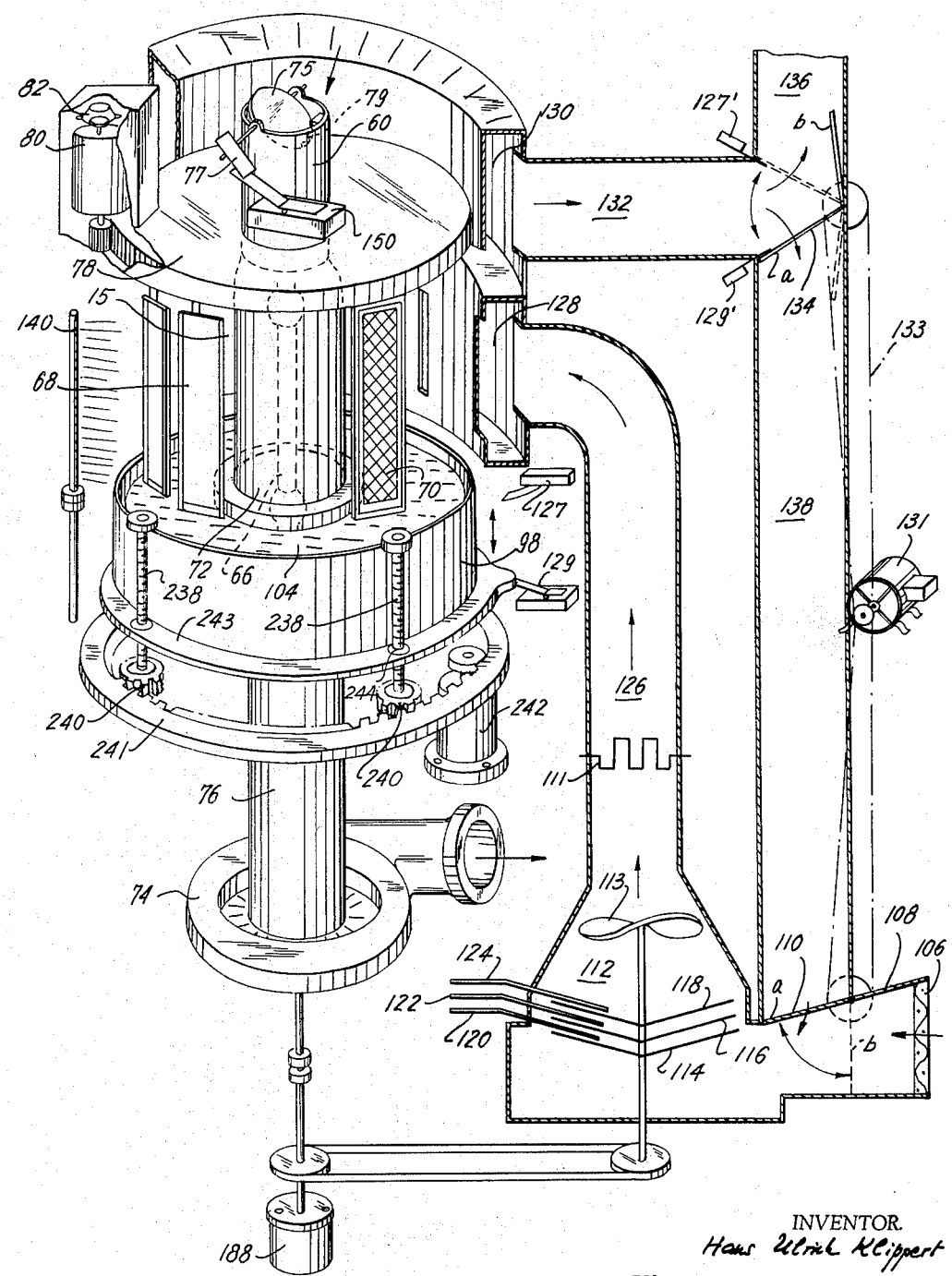

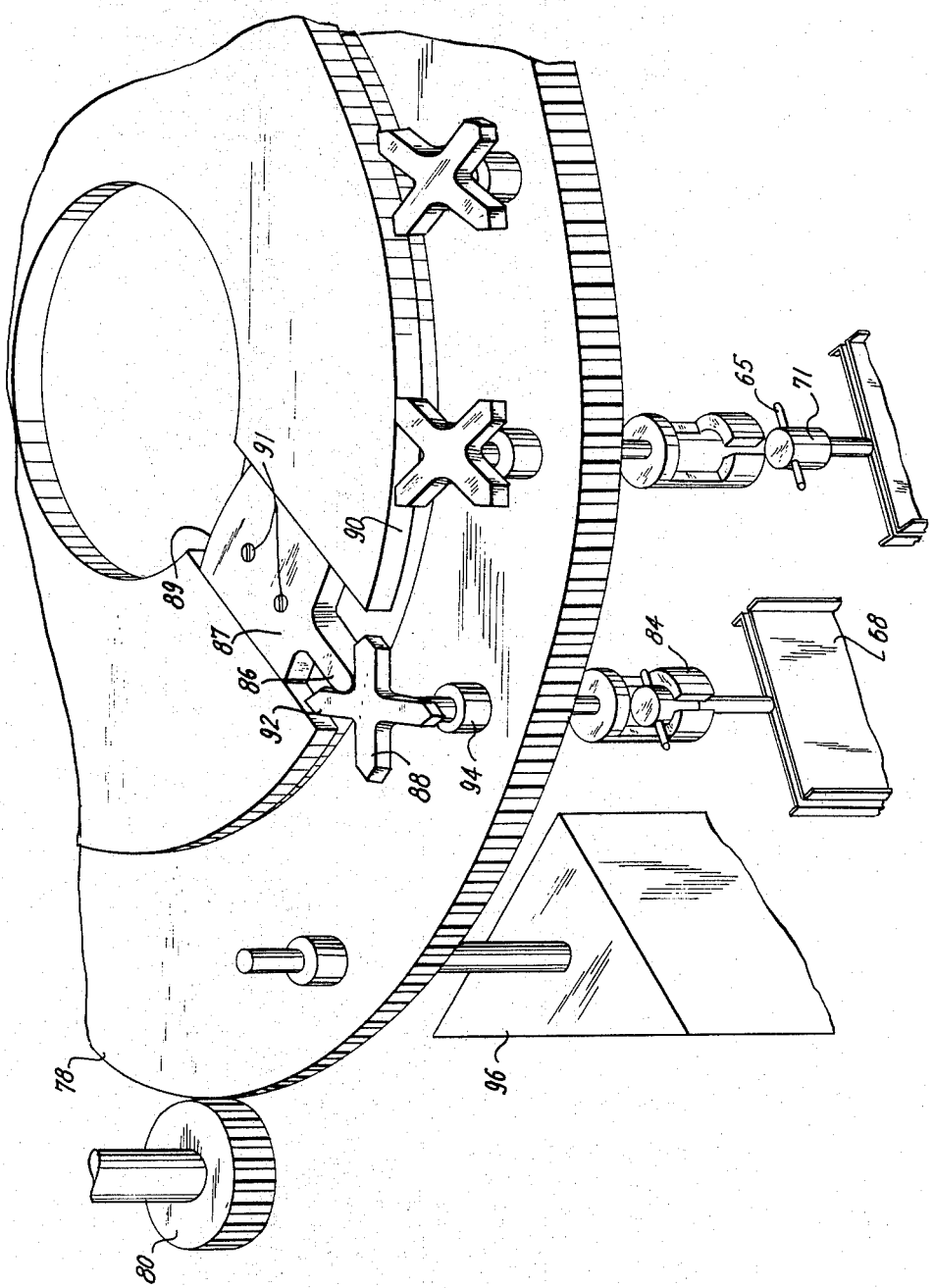

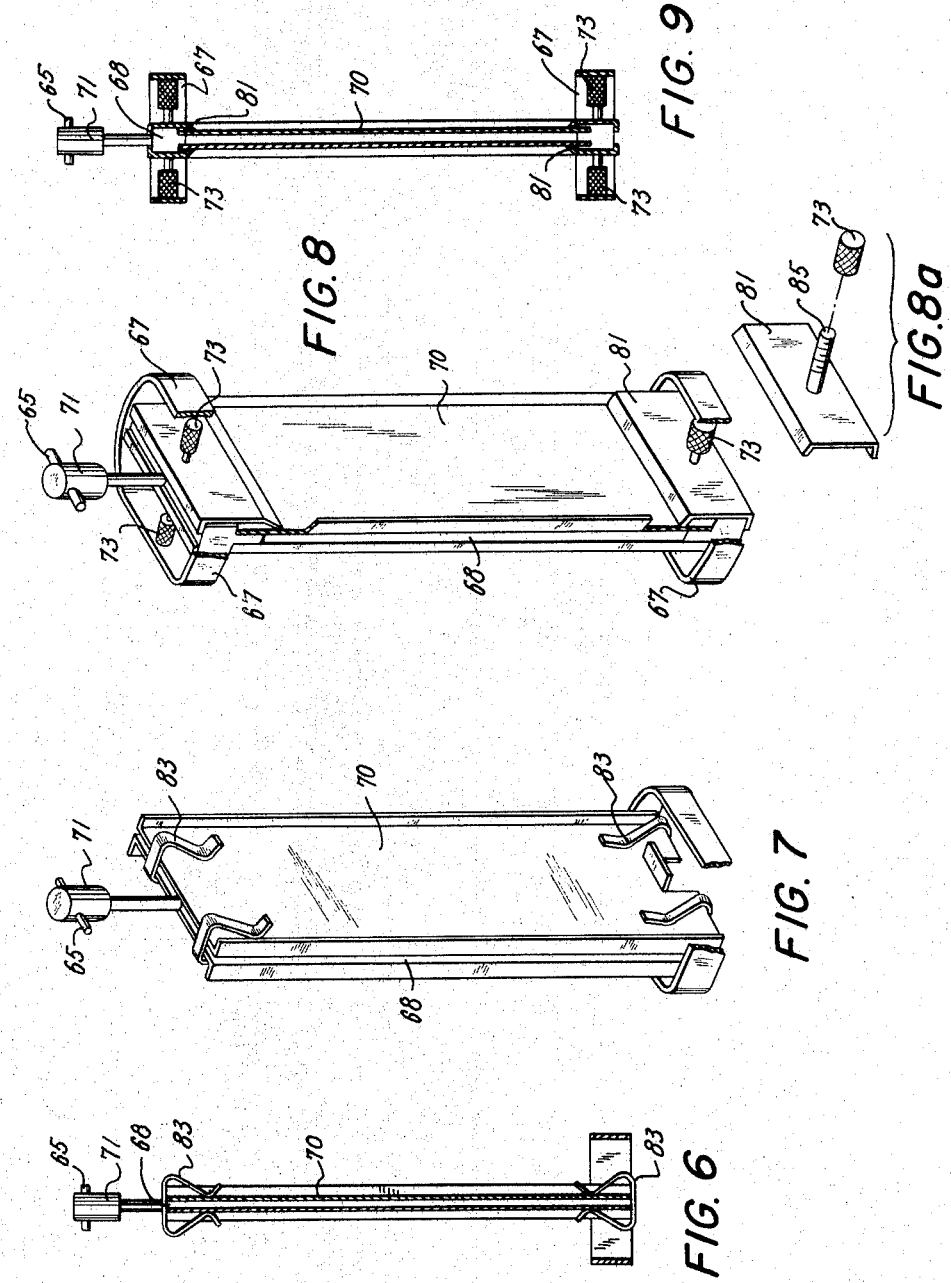

INVENTOR.
Hans Ulrich Klippert
BY
Michael S. Striker

INVENTOR.
Hans Ulrich Klippert
BY
Michael J. Striker

FIG. 13
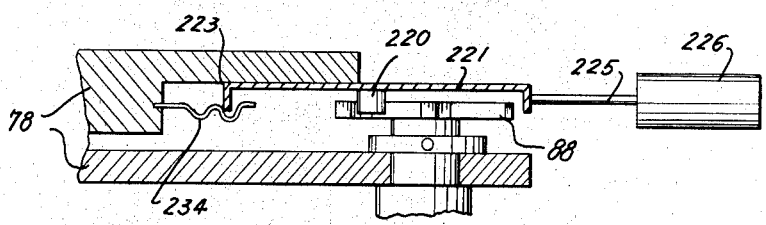
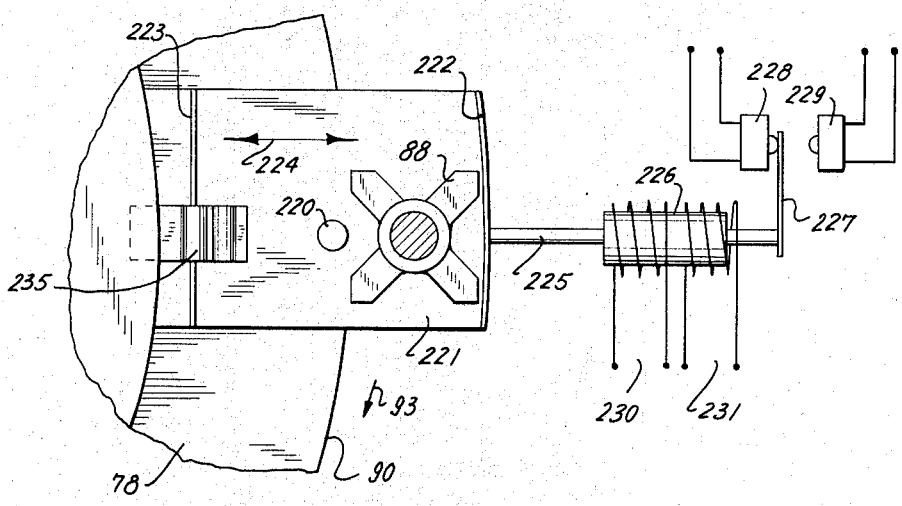
FIG. 14
INVENTOR.
Hans Ulrich Klippert
BY
Michael J. Striker Dec. 21, 1965   H. U. KLIPPERT   3,224,266
TESTING APPARATUS FOR DETERMINING RESISTANCE
TO WEATHER INFLUENCES
Filed June 7, 1962   12 Sheets-Sheet 11

INVENTOR.
Hans Ulrich Klippert
BY
Michael S. Striker

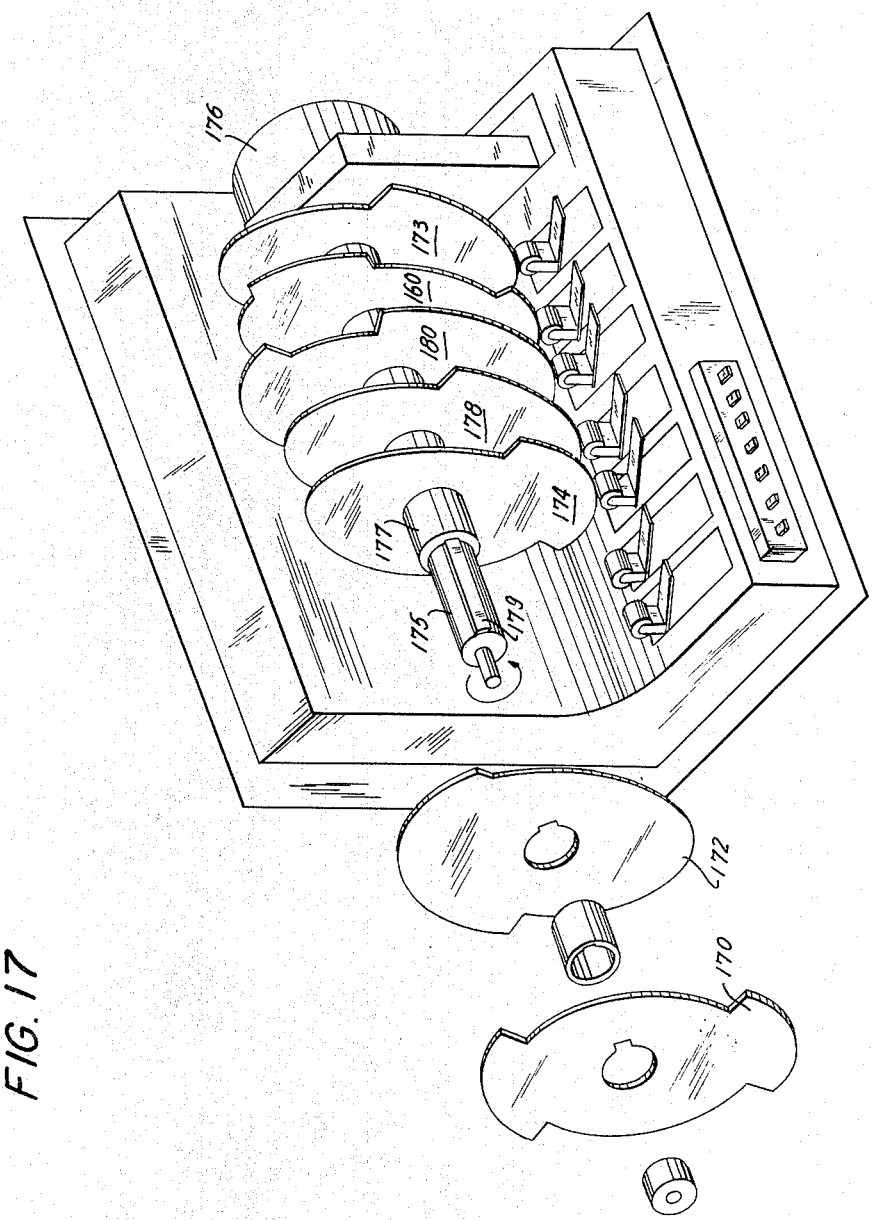

United States Patent Office 3,224,266
Patented Dec. 21, 1965

3,224,266
TESTING APPARATUS FOR DETERMINING RESISTANCE TO WEATHER INFLUENCES
Hans Ulrich Klippert, Hanau am Main, Germany, assignor to Quarzlampen Gesellschaft m.b.H., Hanau am Main, Germany
Filed June 7, 1962, Ser. No. 200,746
Claims priority, application Germany, June 9, 1961, Q 661
7 Claims. (Cl. 73—150)

The present invention relates to testing apparatus.

More particularly, the present invention relates to testing apparatus used to test various materials in order to determine their capability of resisting weather influences. Such materials would be, for example, various paints, varnishes, textiles, etc.

Although testing apparatus of this general type is known, it is not possible with one apparatus to carry out a wide variety of tests so that it becomes necessary to use several different machines before one can form a very complete picture of the capability of any given sample to withstand the effects of different weather conditions.

It is accordingly a primary object of the present invention to provide a testing apparatus which is capable of subjecting the samples which are to be tested to all of the different influences which they would normally encounter due to changes in weather, and of course the testing apparatus subjects the samples with considerable intensity to these various influences so that it is possible to determine in a relatively short time the effect of long periods of exposure to weather on the particular samples.

It is also an object of the present invention to provide a testing apparatus which can accommodate not only a relatively large number of test samples all at the same time but which can also accommodate test samples of a much larger size than has hitherto been possible in known apparatus of comparable size, so that with the apparatus of the invention a large number of relatively large samples can be tested all at the same time.

A further object of the present invention is to provide an apparatus of the above type which can subject the samples to moisture tests of varying degrees whether it be simple humidity in the atmosphere, rain, or complete immersion in liquid.

An additional object of the present invention is to provide a test apparatus which will automatically stop when something goes wrong during the operation of the apparatus so that the apparatus is extremely safe not only from the standpoint of preventing injury to itself but also from the standpoint of preventing injury to the personnel associated with the apparatus.

A still further object of the present invention is to provide an apparatus of the above type which, while it continues to operate, nevertheless is capable of permitting the operator to change a sample or to insert a sample or remove a sample.

A still further object of the present invention is to provide a testing apparatus of the above type which can subject the samples to the influence of heat without requiring any complex cooling systems as well as without requiring various filtering elements to be cleaned periodically and while at the same time maintaining the interior of the apparatus at a desired temperature without an undesirably high temperature at the upper part of the apparatus.

Another object of the present invention is to provide for an apparatus of the above type a structure which is capable of very precisely regulating the humidity of the space in which the samples are located.

Furthermore, the objects of the present invention include a structure which enables the air currents which move through the space in which the samples are located to be controlled in such a way that, for example, a change-over can easily be made between circulation in a closed circuit or circulation involving introduction of fresh air into the apparatus, as well as any desired combination of these two types of circulation.

The objects of the present invention also include the provision of an apparatus of the above type which is capable of being automatically driven according to any preselected program of operations as well as one which is capable of being manually operated.

With the above objects in view the invention includes, in a testing apparatus of the type referred to above, a light source and a plurality of sample-carriers distributed about the light source. These sample-carriers are carried by a rotary support means which turns about an axis on which the light source is located, so that during turning of the support means the several sample-carriers, and of course the samples carried thereby, are moved around the light source. The several sample-carriers are preferably suspended from the rotary support means and in addition each of the sample-carriers is turnable with respect to the support means about an axis parallel to that around which the support means turns, and in accordance with the present invention a means is provided for turning each of the sample-carriers around its turning axis with respect to the support means as the sample-carriers move around the light source, so that in this way it is possible to achieve not only the effect of light and dark on a given sample with a controlled change-over between light and dark, but in addition it is possible to carry a relatively large number of samples inasmuch as while one sample is directed away from the light source another sample may be directed toward the light source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a diagrammatic illustration of the chamber in which the test samples are located as well as the structure for subjecting the samples to various influence;

FIG. 3 is a fragmentary perspective illustration of the manner in which the sample-carriers are supported as well as the manner in which they are turned;

FIG. 6 shows in a sectional side elevation one possible embodiment of a structure for supporting samples on a sample-carrier;

FIG. 7 is a perspective illustration of the structure of FIG. 6;

FIG. 8 is a perspective illustration of another embodiment of the structure for mounting the samples on the sample-carriers;

FIG. 8a is a perspective view of some of the elements of the structure shown in FIG. 8 in disconnected condition;

FIG. 9 is a sectional side elevational view of the structure of FIG. 8;

FIG. 11 shows another position of the structure of

Figure 10:
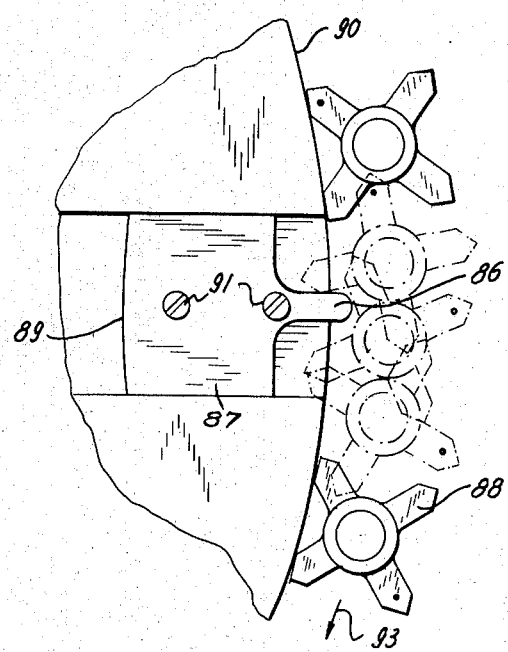
FIG. 10 illustrates the manner in which the sample-carriers are respectively turned about their axes.
Figure 11:
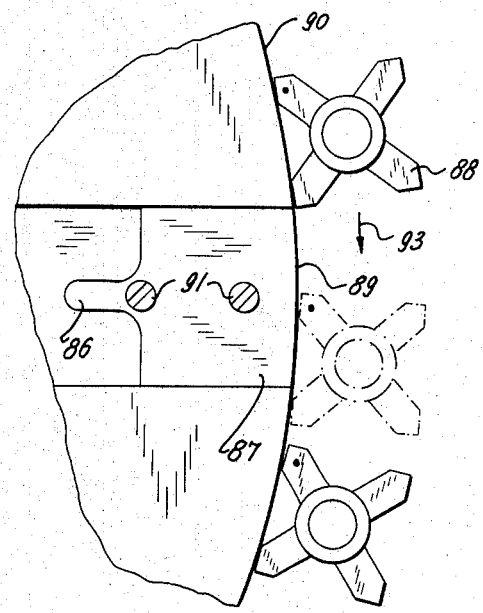
Figure 12:
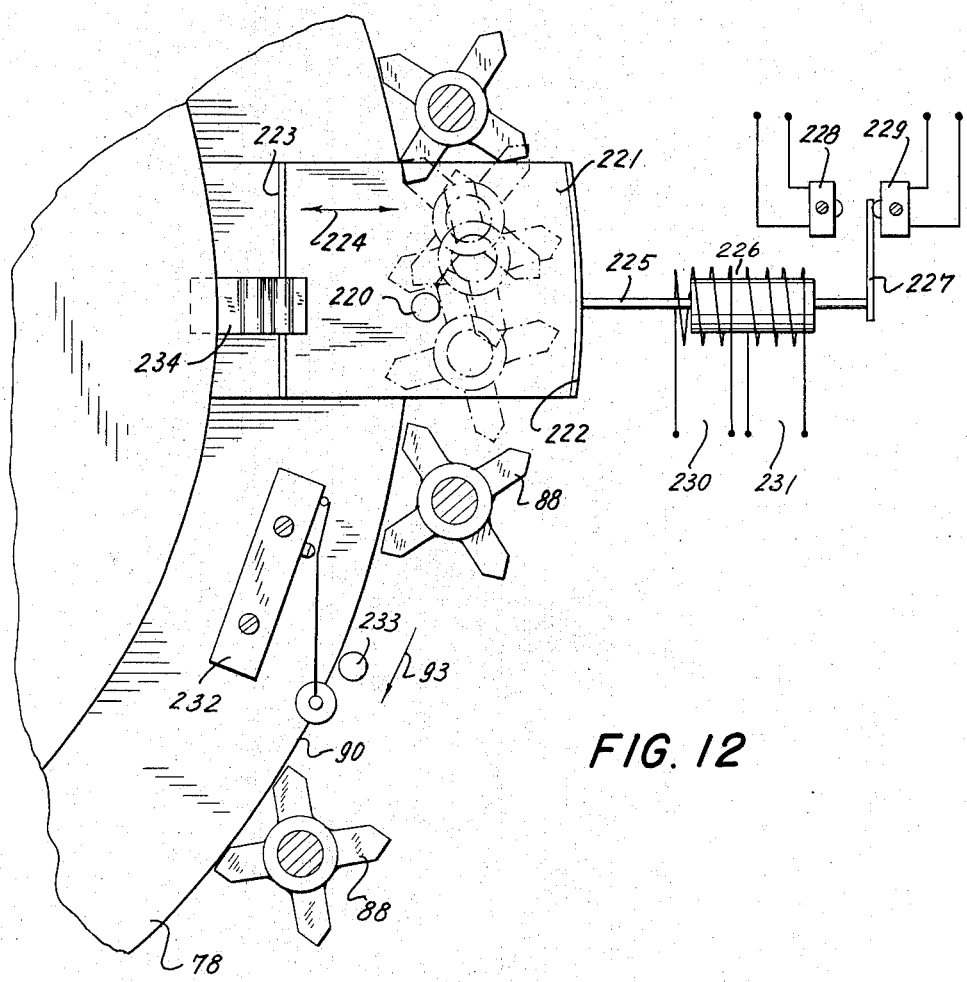
Figure 15:
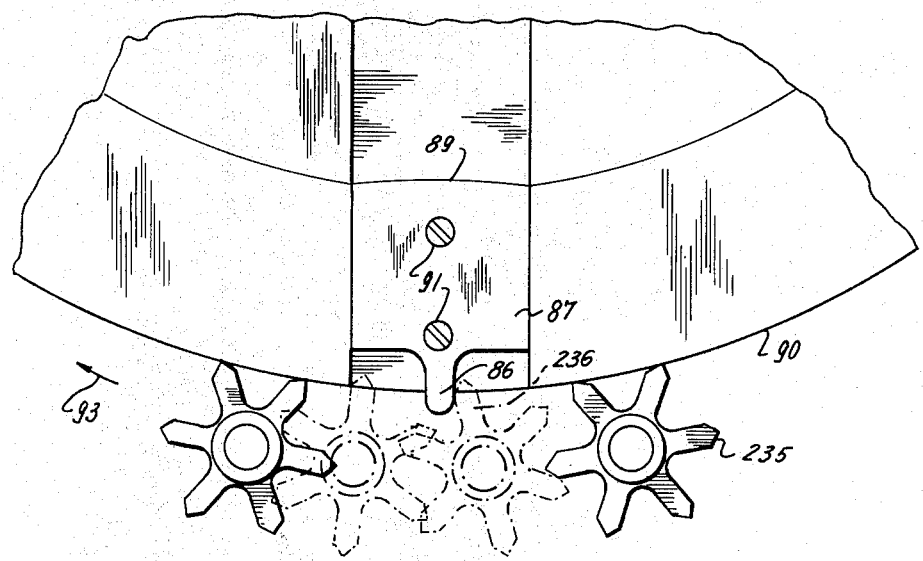
Figure 16:
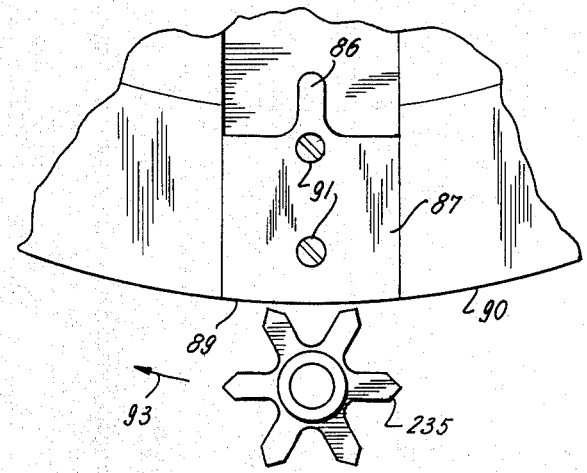

FIG. 10, the structure in FIG. 11 preventing turning of the sample-carriers about their axes, respectively;

FIG. 12 is a fragmentary illustration of another embodiment of a structure for either turning each sample-carrier about its axis or preventing it from turning;

FIG. 13 is a fragmentary sectional elevation of the structure of FIG. 12;

FIG. 14 shows the structure of FIG. 12 in a position where the sample-carriers will not turn about their axes, respectively;

FIG. 15 shows the manner in which turning is provided for a three-sided sample-carrier;

FIG. 16 shows the structure of FIG. 15 after it has been reset so as to prevent turning of the sample-carrier; and FIG. 17 is a diagrammatic illustration of the programming structure for providing automatically a selected program of controls.

Figure 1:
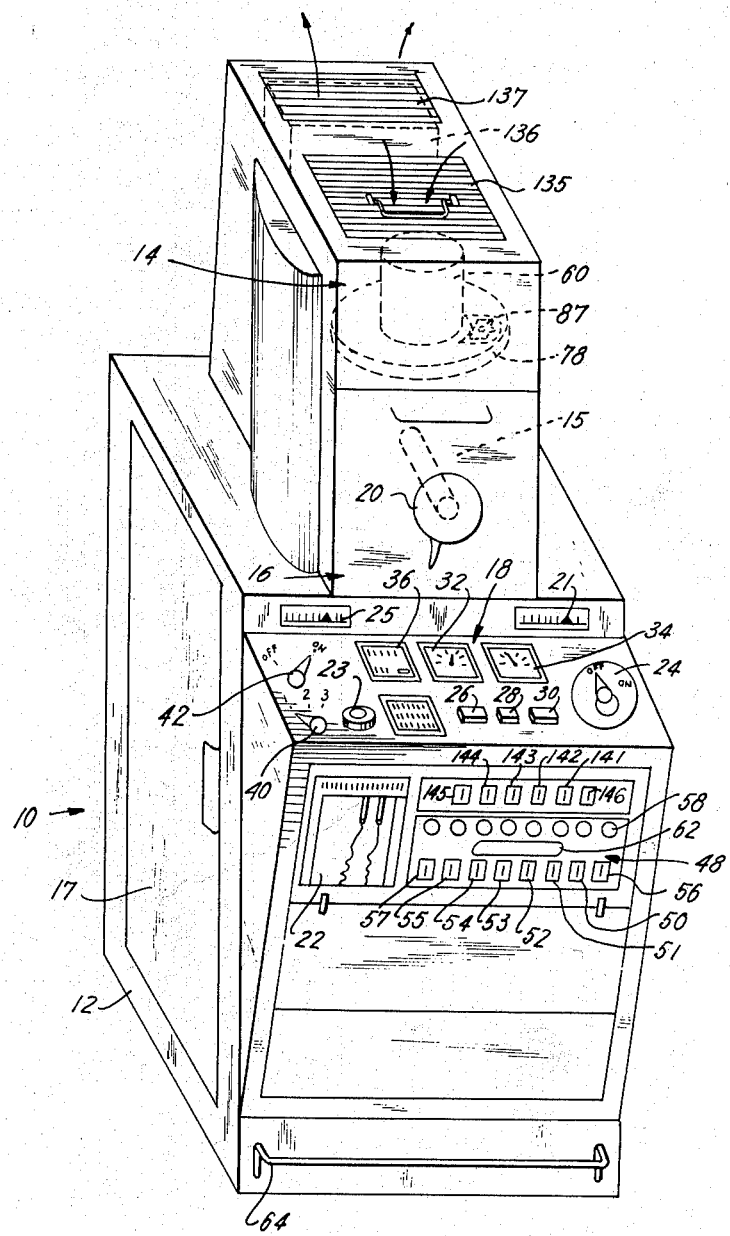
FIG. 1 is a perspective illustration of the machine according to the invention.

Referring to FIG. 1, the apparatus 10 of the invention includes a lower portion 12 in which is located the structure for providing the various temperatures, humidities, and air currents for testing the samples, and the lower portion 12 includes a side door 17 through which access may be had to the interior of the lower portion 12 where all of this structure is located. The machine or apparatus 10 includes, above the portion 12 thereof, an upper part 14 in which is located the testing chamber, and various samples are located in this chamber. Access to the testing chamber is had through the door 16 which is hinged at its lower edge to the cover for the upper part 14 of the apparatus, so that when the door 16 is opened it is swung by the operator downwardly and forwardly over the instrument panel 18 so that any humid air which escapes from the testing chamber when the door 16 is opened is prevented from clouding the instrument panel by the door 16.

This door 16 is preferably made of a transparent material which is capable of filtering out harmful light rays which issue from a light source within the testing chamber so that these harmful light rays will not reach an observer on the outside of the apparatus while at the same time the observer can look through the door 16 into the testing chamber to examine the reactions of the samples. For this purpose the door 16 may be made of a plastic material which has a gray color while at the same time being transparent and which is sufficiently resistant to temperature and humidity to avoid any deleterious effects on the door 16. As a result of this gray color the observer can perceive with the naked eye color changes which occur on the samples during the running of a test. With conventional relatively small viewing glasses which are colored blue this perception of color changes during the running of a test is not possible.

The door 16 carries an instrument 20 which detects humidity and temperature changes and the feelers of the instrument 20 extend behind the door 16 into the testing chamber 15. The measurement of humidity can be brought about by a hair hygrometer, or a psychrometer or a lithium chloride humidity measuring instrument. The measurement of the temperature is brought about by a resistance thermometer. The measured values of humidity and temperature are transmitted electrically and the humidity appears at a combined indicating and control device 21 at the instrument panel 18, while the temperature is transmitted by a thermostat 23 to the combined controlling and indicating device 25. The recording instrument 22 is also electrically operated and carries a pair of pens which inscribe on a moving strip of paper in a manner well known in the art variations in temperature and humidity, respectively.

The instrument panel 18 carries all of the instruments and switches which are used for controlling and indicating the operation of the apparatus. A main switch 24 is provided for turning the entire apparatus on and off, and after the main switch 24 is closed the button 26 is depressed in order to close a switch in order to start the operation of the apparatus, and then a button 28 is depressed in order to close a further circuit for energizing the light source which is described below, and these operations are further described in connection with the electrical circuit of FIG. 4.

The button 30 is depressed in order to interrupt the operation of the apparatus for a relatively short period of time, so that intermittent interruptions in the operation, when desired, may be brought about by depression of the button 30. The instrument panel also includes the ammeter 32 and the voltmeter 34 which allows the operator to observe the current and voltage, respectively, of the light source 66, this light source being indicated in FIG. 2 as well as in FIG. 4. A timer 36 measures the length of time that the light source is operated. A switch 40 is available for controlling the humidity in a stepwise manner, and the instrument 42 indicates the type of air circulation which is applied to the testing chamber 15. This air circulation is controlled by the flaps 110 and 134 shown respectively at the lower and upper parts of the right portion of FIG. 2, and in accordance with the positions of these flaps 110 and 134 either fresh air will be drawn into the apparatus or a closed air circuit will be provided, or a combination of these two types of circuits will be provided.

At the front of the lower portion 12 of the apparatus 10 is located a unit 48 (FIG. 1) which can either be tilted outwardly away from the apparatus or can be removed as a unit, and this unit 48 includes various switches and lamps used in connection with automatic operation of the apparatus. The various functions of the apparatus are set into operation separately and can be separately turned off or turned on. Thus, the switch 50 of unit 48 is used for heating the testing chamber, the switch 51 for raising and lowering a container of liquid in which the test samples are immersed, the switch 52 for controlling the humidity, the switch 53 for controlling the turning or lack of turning of the samples with respect to the rotary support described below, the switch 54 for providing an action simulating the rain, the switch 55 for providing circulation of air, and the switch 56 for energizing the driving motor which operates the programming control discs referred to below. In addition there is a switch 57 for use in connection with the energizing of the light source. Each of these switches 50–57 has a signal lamp 58 associated therewith at the exterior of the unit 48, and the several lamps 58 indicate to the operator those switches of the unit 48 which are closed. The entire unit 48 may be pulled out of the apparatus by grasping the handle 62 and in this way the programming structure shown in FIG. 17 is rendered accessible.

Just over the unit 48 at the front of the apparatus are located a plurality of switches 141–146 which enable various functions to be set into operation manually and independently of the automatic operation.

In order to be able to change a sample-carrier without stopping the operation of the entire apparatus, a foot pedal 64 is provided at the lower front part of the apparatus, and when the operator actuates the foot pedal 64 the movement of the test samples is stopped while the rest of the apparatus continues to operate so that in this way the operator can change a sample or remove or insert a sample without stopping the operation of the entire apparatus. A particular advantage of this feature resides in the fact that the light source continues to operate when the foot pedal 64 is actuated by the operator, so that, inasmuch as the life of the light source decreases with an increase in the frequency with which the light source is turned off and turned on, the life of the light source is enhanced inasmuch as with this construction interrupting the operation of the light source for a short period of time is avoided. Moreover, the light source is of the type which cannot be energized within a short time after it is turned off, so that with this feature there is also the advantage of no necessity for waiting for a substantial period of time before the light source can again be energized.

At the upper part of the apparatus 10 is located a removable cover 135 provided with louvers or the like which form passages through which the air can move into and out of the apparatus. These passages enable cooling air to enter for the purpose of cooling the light source 66, and by removing the cover 135 it is possible to remove one light source 66 and replace it with a new light source, and in addition when the cover 135 is removed access may be had to the plate 87 for a purpose described below. The louvers at the front of the cover 135 provide passage of air for cooling the light source, while the louvers 137 at the rear of the cover 135 communicate with the duct 136 so that air can pass out of the duct 136 into the room, and in this way air may be discharged from the testing chamber 15 as will be apparent from the description below.

The interior construction of the apparatus 10 of the invention is indicated schematically in FIG. 2. The various sample-carriers 68 are distributed about the light source 66. These sample-carriers 68 carry the various samples 70 which are to be tested. With conventional apparatus it has been possible up to the present time to test samples having a maximum size of 100 by 45 mm., while, in contrast, with the apparatus of the invention it is possible to place on each carrier 68 a sample having a size of 220 by 68 mm. Moreover, whereas in conventional apparatus only ten sample-carriers could be accommodated, it is possible to accommodate in the apparatus of the invention 15 sample-carriers.

The light source 66 preferably takes the form of a long-arc xenon lamp of 4.5 kw. The lamp 66 is located within a tubular heat filter 72 which prevents transmission of undesired heat outwardly beyond the lamp 66. This transparent heat filter 72 forms a section of an elongated tube having an upper portion 60 connected to and extending upwardly from the tubular portion 72 and a lower portion 76 extending downwardly from the tubular portion 72, so that the parts 60, 72, 76 form a continuous tube in which the lamp 66 is located. A fan 74 is connected with the lower end of the tube 76 for drawing air downwardly through the tube elements 60, 72, 76, and in this way cooling air continuously is drawn downwardly past the lamp 66 so as to prevent undesired heating of the apparatus from the light source 66. Furthermore, the downward movement of the air prevents the upper part of the apparatus from becoming undesirably hot. In order to control the apparatus so that it will not operate if the cooling air does not flow downwardly through the tube 60, 72, 76, the air which enters into the tubular portion 60 deflects a flap 75 which carries an arm 77 which actuates a microswitch 150. As long as this switch 150 is closed the entire apparatus can operate, as will be apparent from the description below in connection with FIG. 4, while when the switch 150 is opened the entire apparatus is stopped. A spring 79 urges the flap 75 to turn upwardly to a position where the arm 77 no longer closes the microswitch 150. Therefore, with this construction as long as cooling air flows past the lamp 66 the apparatus can operate while if there is for any reason an interruption in the stream of cooling air the entire apparatus will be automatically stopped and overheating of the apparatus is therefore reliably prevented.

The several sample-carriers 68 are removably suspended from a rotary support means 78 in a manner described below. This rotary support means or carousel 78 is driven by a motor 80, and the motor 80 operates a governor 82 which opens a switch and also stops the operation of the apparatus in the event that the speed of rotation of the carousel 78 falls below a given value. Thus, if for any reason rotation of the carousel 78 should be prevented, as by falling or jamming of the sample-carriers or if the hand of an operator should undesirably get in the way of the moving sample-carriers then the governor 82 will cause a switch to open so as to stop the entire operation and this also is an important safety feature.

As may be seen from FIG. 3, the rotary support means or carousel 78 carries the sample-carriers 68 which are suspended from the carousel 78 and which are turnable with respect to the carousel 78. A means is provided for turning each of the sample-carriers 68 about its turning axis with respect to the rotary support means 78 while the latter turns about the axis on which the lamp 66 is located, and each of the sample-carriers 68 is turned through 180° once during each revolution of the support means 78 so that a pair of samples carried respectively by the opposed faces of the carrier 68 will alternately be exposed to light and dark. This simulation of the light-dark effect is of the greatest importance in order to approach natural conditions, particularly where the samples are of the type where there may be a reaction between the material of the sample itself and a colored coating or other coloring material carried thereby, since such reaction between the coloring material and the material of the sample show up after repeated alternate exposures of the sample to light and dark.

As may be seen from FIG. 3 the rotary support means 78 carries a plurality of coupling members 84 which are turnable in bearings 94, respectively, which are fixedly carried by the carousel 78, and each rotary coupling 84 includes a stem which extends through the bearing 94 and which carries removably at its upper end a star member 88 which forms part of the means for turning each sample about its axis relative to the carousel 78. The rotary carousel or support means 78 is in the form of a ring which turns around a stationary member which includes just above the ring 78 a stationary plate portion provided with a circular periphery 90 whose axis is coincident with the axis of turning of the carousel 78, and a pair of the spokes 92 of each star member 88 has its tips riding along the circular periphery 90 of the stationary plate so that in this way the coupling members 84, and of course the sample-carriers 68 carried thereby, cannot turn with respect to the support means 78 while the latter turns with the spokes 92 which are directed toward the periphery 90 located closely adjacent to the latter. Thus, at this time the sample-carriers can only turn together with the carousel 78 about the lamp 66. However, it will be noted from FIG. 3 that the plate which is provided with the periphery 90 is formed with a cutout which interrupts the periphery 90 and in which a plate 87 is located, this plate 87 being removably fixed by the screws 91 to the stationary member about which the carousel 78 turns, and the member 87 has a finger 86 which forms a projection extending radially beyond the circle along which the periphery 90 of the stationary plate is located. As a result, as may be seen particularly from FIG. 10, as each star member 88 turns in the direction of the arrow 93 shown in FIG. 10, its leading spoke will engage the projection 86 so that each star member will turn in a clockwise direction through somewhat more than 90° as it moves beyond the projection 86. This is particularly apparent from following the spoke of each star member 88 of FIG. 10 which is provided with a dot so that it may be identified as the star member turns while the entire carousel turns in the direction of the arrow 93 of FIG. 10. The turning of each star member 88 by the projection 86 causes the spoke of each star member which is just ahead of that which first engages the projection 86 to turn into the space between the projection 86 and the lower edge of the cutout which receives the plate 87, as viewed in FIG. 10, so that this latter spoke will engage this lower edge of the cutout of the stationary plate to complete the turning of the star member 88 through 180° as it moves beyond the cutout in which the plate 87 is located, and it will be noted from a comparison of the pair of solid-line star members of FIG. 10 that the spoke which is provided with a dot has in fact been turned through 180° with this structure.

As was pointed out above the finger or projection 86 is integral with the plate 87 which is removably fixed to the stationary member around which the carousel turns by the screws 91. In the event that it is desired to have turning of all of the sample-carriers around the lamp 66 without any turning of the carriers with respect to the rotary support means, then the screws 91 are loosened and the position of the plate 87 is reversed so that it takes up the position indicated in FIG. 11. In this position the edge portion 89 of the plate 87 forms a continuation of the periphery 90 so that this periphery is now completely uninterrupted and therefore there will be no turning of the sample-carriers with respect to the rotary support means, as is particularly apparent from FIG. 11. Thus, in order to change the test run between one where the samples are turned with respect to the support means and one where they do not turn with respect to the support means it is only necessary for the operator to remove the cover 135 of FIG. 1 so as to have access in this way to the plate 87, and then the plate 87 can be placed either in the position of FIG. 10 or in the position of FIG. 11.

FIGS. 12–14 show another embodiment of a structure of the invention for changing over between movement of the sample-carriers around the lamp 66 without turning of the sample carriers around their axes, respectively, and with turning of the sample-carriers around their respective axes, and the embodiment of FIGS. 12–14 is capable of making this change electrically so that with this embodiment it is unneccessary to remove the cover 135 in order to make the change between these two types of operation. Moreover, with this embodiment it is possible to use the automatic means 48 for automatically effecting a change-over between these types of operation at preselected intervals, or by manipulation of the switch 143 (FIG. 1) it is possible to manually actuate the electrical structure in order to make the change-over from one to the other type of operation.

Referring to FIGS. 12–14, it will be seen that the projection 86 is replaced in this embodiment by a pin 220 which is fixedly carried by a carriage 221 which is slidably supported in a radially extending groove of the stationary plate around which the carousel 78 turns. At its outer end the carriage 221 is provided with an arcuate flange 222 which extends along a circle whose center is in the axis of turning of the carousel 78. The inner end of the carriage 221 is also in the form of a flange 223. The carriage 221 is shiftable in opposite directions as indicated by the arrow 224 in FIG. 12. At its outer end the carriage 221 is fixed to a rod 225 which fixedly carries the armature 226 of an electromagnet. The rod 225 fixedly carries, in addition to the armature 226, a switch-operating member 227. In one position of the carriage 221 the switch-operating member 227 actuates a switch 229, while in another position (FIG. 14) of the carriage 221 the switch-operating member 227 actuates the switch 228. The armature 226 cooperates with a pair of coils 230 and 231. A microswitch 232 is carried by the stationary plate with respect to which the carousel 78 turns, and the carousel carries a pain 233 which actuates the microswitch 232 once during each revolution of the carousel. The mircroswitch 232 is electrically connected with the coils 230 and 231 in such a way that when the carriage 221 is in the position of FIG. 12 the closing of the microswitch 232 will energize the coil 230 so as to shift the carriage 221 to the left, as viewed in FIG. 12, from the position of FIG. 12 to that of FIG. 14, and at the end of this movement the switch-operating member 227 will actuate the switch 228 so as to open the circuit of the coil 230, and the carriage 221 will then remain in the position of FIG. 14. At the end of the next revolution of the carousel the microswitch 232 will again be closed, and at this time it will energize the coil 231 so as to return the carriage 221 from the position of FIG. 14 to that of FIG. 12, and when at the end of this movement the member 227 opens the switch 229 the coil 231 will be deenergized and the carriage 221 will remain in the position of FIG. 12 until the next revolution is completed. In this way with the structure of FIG. 12 the carriage 221 will be shifted back and forth. The change-over with the electromagnetic structure of FIGS. 12–14 can also be effected manually by the switch 143 or automatically with a control disc of the automatic means 48, as will be apparent from FIG. 4, and in either of these events the switch 232 is disconnected from the circuit so that the change-over will be carried out either automatically or manually.

As is apparent from FIG. 12, when the carriage 221 is in its outer position the pin 220 is in the path of movement of the star members so as to turn the latter through 180° in exactly the manner described above in connection with the projection 86 of the plate 87, while when the carriage 221 is in the inner position shown in FIG. 14 the flange 222 cooperates with the outer spokes of the star members 88 to prevent turning of the latter so that in this way the sample carriers will not turn when the carriage is in the position of FIG. 14. A leaf spring 234 which has the curvature indicated in FIG. 13 is carried by the stationary part of the structure and cooperates with the inner flange 223 of the carriage 221 for releasably holding the latter either in the position of FIG. 12 or in the position of FIG. 14.

As is apparent from the lower left portion of FIG. 3, the sample-carriers instead of taking the form of elements 68 which have opposed faces which are directed away from each other can take the form of a member 96 which has the cross section of an equilateral triangle, and with this type of sample-carrier it is possible to mount three samples on each carrier.

FIGS. 6–9 illustrate two embodiments of structures for removably connecting the samples to the sample-carriers 68, and of course similar structure may be used in connection with the sample-carriers 96. As may be seen from FIGS. 6 and 7 spring clips 83 extend around the upper and lower edges of the carrier 68 and removably fasten to the opposed faces thereof the samples 70.

In the embodiment of FIGS. 8 and 9 endless members 67 are fixed to the upper and lower ends of each carrier 68, and a pair of plates 81 are located on each side of the carrier adjacent to the upper and lower ends thereof. Each plate 81 fixedly carries a threaded stud 85 on which an externally knurled elongated member 73 is capable of being threaded. As is most clearly apparent from FIG. 9, when the member 73 has been threaded onto the stud 85 sufficiently to permit the plate 81 together with the member 73 to be placed in the position indicated in FIG. 9, the operator turns the member 73 outwardly away from the plate 81 so that the member 73 presses against the member 67 which is fixedly carried by and surrounds the carrier 68 and thus presses the plate 81 against the sample 70 so as to hold the latter against the carrier 68. All of the four plates 81 and the parts associated therewith operate in this manner in FIGS. 8 and 9.

In order to suspend each of the sample carriers from the carousel, the upper end of each sample carrier 96 or 68 fixedly carries a stem to the top end of which the cylinder member 71 is fixed, and this cylindrical member 71 carries a cross-pin 65. The member 71 together with the cross-pin 65 can be slipped into the coupling 84 as is particularly apparent from FIG. 3. The coupling 84 has a top wall which is fixed to the lower end of the rod which extends turnably through the bearing 94 and which is fixed at its top end to the star member 88, and from this top wall of the coupling member 84, this coupling member has a pair of downwardly extending substantially L-shaped legs the vertical legs of which are integral with and extend downwardly from the top wall while the horizontal legs are curved in the manner indicated in FIG. 3. Thus, with this construction the operator can slip the cylindrical member 71 between the vertical legs of the coupling member 74 and then can turn the carrier so as to place the cross-pin 65 thereof in the position indicated for the central sample carrier of FIG. 3 where the ends of the cross-pin engage the L-shaped members of the coupling member 84 at the intersection between the vertical and horizontal legs of each L-shaped member, so that in this way irrespective of the direction of turning of the coupling member 84 the sample-carrier will necessarily be constrained to turn therewith, and at the same time it is a simple matter to quickly and easily remove or replace a sample-carrier.

When using three-sided sample-carriers 96, the star members 88 shown in FIG. 3 are removed from the top ends of the stems which extend turnably through the bearings of the carousel 78, and these star members are replaced with star members 235 shown in FIGS. 15 and 16. The star members 235 have six spokes 236, and except for this difference the structure operates in exactly the manner described above with the single difference that because of the six spokes 236 which are angularly spaced from each other by 60° the projection 86 will cooperate with the star members 236 to turn each of the sample-carriers 96 through 120° with respect to the rotary support means during each revolution thereof, so that in this way the three sides of the carrier 96 will be successively exposed to the lamp during turning of the rotary support means 78. Of course, the plate 87 may be changed from the position of FIG. 15 to that of FIG. 16 so as to provide no relative turning of the carriers with respect to the rotary support means. Furthermore, it is clear that the embodiment of FIGS. 12–14 may cooperate with the star members 235 to produce the same results as the plate 87 in FIGS. 15 and 16, so that it is also possible to make the change-over between the different type of operations electrically with the star members 235.

Referring now to FIG. 2, it will be seen that there is located beneath the ring of sample-carriers 68 an annular container 98 which is open at its top end and which is adapted to be provided with a suitable liquid such as water. The annular container 98 surrounds the tube 76 which forms a continuation of the filtering tube 72 described above, and the annular container 98 is capable of being moved vertically from the position shown in FIG. 2 upwardly to a position surrounding the lamp 66, and in this upper position the samples will of course be immersed in the liquid 104 which is located in the container 98. In this way it is possible to make tests with respect to swelling characteristics of the samples, for example. In order to raise and lower the container 98, a plurality of screw members 238 are provided. These screw members 238 are restrained against axial movement in any suitable way and thus can only turn about their axes, respectively. At the lower ends the screw members 238 respectively fixedly carry the pinions 240, and these screw members 238 respectively extend through openings of a flange 243 which is fixed to the container 98. In these openings the flange 243 fixedly carries the nuts 244 through which the screw members 238 threadedly extend, respectively, so that the turning of the screw members 238 in one direction or the other will result in raising or lowering of the container 98. All of the pinions 240 mesh with the inner toothed periphery of a ring gear 241 which is supported in any suitable way for rotary movement about its axis, and a motor 242 drives a pinion which also meshes with the ring gear 241, so that in this way in accordance with the direction of rotation of the motor 242 the ring gear 241 will be turned in one direction or the other so as to cause the screw members 238 to turn in one direction or the other in order to raise or lower the container 98. When the container 98 reaches the lower end of its downward movement a projection of the flange 243 actuates a microswitch 129 for opening the circuit of the motor 242 so as to limit in this way the downward movement of the container 98, while at the end of its upward movement the projection of the flange 243 engages a microswitch 127 so as to open the circuit of the motor 242 and in this way limit the upward movement of the container 98. Thus, with this structure it is possible to maintain the samples immersed for a given length of time in the liquid 104 so as to test the swelling characteristics of the samples, and thereafter the container 98 can be lowered to the position where the samples no longer engage the liquid 104.

Figure 5:
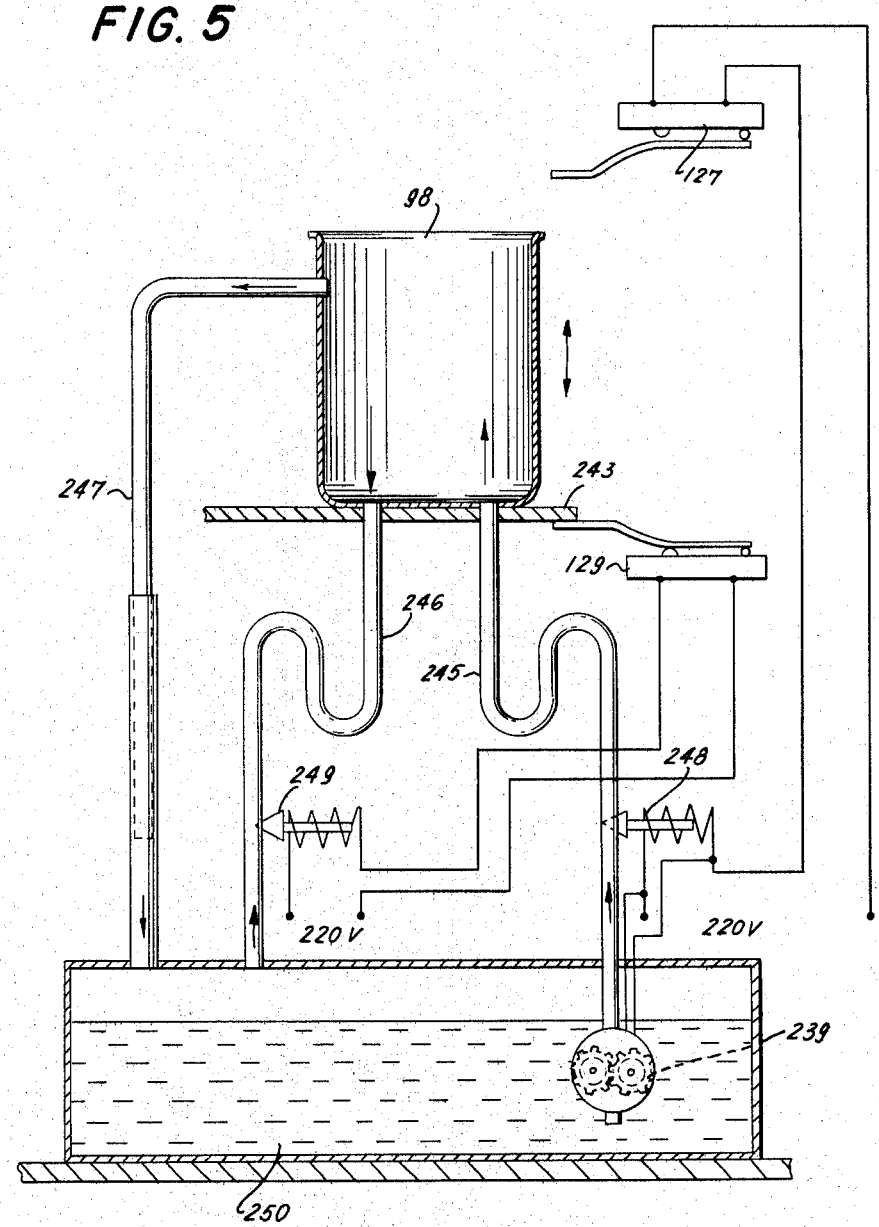
FIG. 5 is a diagrammatic illustration of the structure for immersing the samples in a liquid.

FIG. 5 illustrates schematically the control of the flow of liquid in the circular container 98 which surrounds the tubular structure in which the lamp 66 is housed. A pair of flexible conduits 245 and 246 which are capable of participating in the upward and downward movement of the container 98 communicate with the bottom end thereof as indicated diagrammatically in FIG. 5, and in addition an overflow conduit 247 communicates at all times with an upper part of the container 98 so that liquid therein can only reach the level of the upper end of the conduit 247, and in this way it is not possible for liquid to spill over the top end of the container 98. All of the liquid is derived from and returned to a reservoir 250 with which all of the conduits 245–247 communicate, and the conduit 245 in addition communicates with a pump 239 in the tank 250 and serving to deliver water through the conduit 245 into the tank 98. An electromagnetic valve 248 controls the flow of liquid in the conduit 245, while an electromagnetic valve 249 controls the flow of liquid in the conduit 246. The switches 127 and 129 in addition to controlling the motor 242 as described above in connection with FIG. 2 control the electromagnetic valves 248 and 249; switch 127 also controls the pump 239. In the lower position of the container 98, where the flange 243 thereof cooperates with the switch 129, this switch energizes the valve 249 to maintain the latter open, so that as long as the container 98 is in its lower position any liquid in the container 98 will flow back to the container 250. Thus, not only will liquid 104 empty out of the container 98 when it is in its lower position, but in addition any condensate or any rain-simulating water which drips off the samples into the container 98 will also flow back through the conduit 246 into the tank 250. At this time the valve 248 is unenergized and closed and also the pump 239 does not operate. When the container 98 is raised to its upper position the valve 249 becomes unenergized and therefore closes, and at its upper position the flange 243 will cooperate with the switch 127 so as to open the valve 248 and start the pump 239 so that the liquid will be delivered into the tank 98, and at this time the liquid continuously flows into the tank 98 and out through the overflow conduit 247 back to the reservoir 250. Thus, as long as the container 98 is in its upper position liquid is constantly flowing into the bottom and out of the top thereof.

The structure for controlling the humidity in the testing chamber 15 is illustrated schematically in FIG. 2. For this purpose humid air is delivered into the testing chamber 15, and the air necessary for this purpose is drawn into the apparatus from the surrounding atmosphere through the filter 106. The air passes through the filter 106 into the passage 108 and moves past the flap valve 110 which at this time is in the position illustrated in FIG. 2, and in this way the air reaches the humidifying chamber 112. Moisture is added to the air in the chamber 112 by a plurality of relatively flat conical members 114, 116, 118 which are coaxially fixed to a shaft which is driven through a belt-and-pulley drive from the motor 188 which also drives the fan 74 referred to above. As was pointed out above the fan 74 draws air downwardly through the tubular assembly 60, 72, 76, and this latter air is discharged out of the apparatus in the manner indicated schematically in FIG. 2. The shaft to which the dished members 114, 116, 118 is fixed also fixedly carries a fan 113 which serves to draw the air in through the filter 106 and move the air upwardly through the tube 126 into a distributor 128 in the form of an annular hollow member surrounding the samples and formed at its inner wall with slots through which the humid air escapes into the testing chamber 15. Liquid is delivered in the form of droplets through the several tubes 120, 122, 124 onto the dished members 114, 116, 118, respectively, and these tubes 120, 122, 124 are controlled through solenoid valves in a manner described below in connection with FIG. 4. It is possible for the operator to open a selected number of these tubes so that liquid can be delivered to all of the dished members, or to two of the dished members, or to one of the dished members, so that in this way the intensity of the humidification of the air is capable of being controlled. As a result of the rotary movement of the dished members the liquid deposited thereon flies centrifically from the outer edges of the dished members in the form of a very fine atomized mist into the air which is delivered through the conduit 126 into the chamber 128 and from the latter into the chamber 15. In this way it is possible to subject the samples to the effects of humidity. An annular chamber 130 is located directly above the chamber 128 and also communicates with the interior of the testing chamber 15, and the humid air is drawn out of the chamber 15 into the chamber 130 from the latter into a conduit 132 which communicates with the annular chamber 130, this latter chamber being formed also with openings communicating with the testing chamber 15. The conduit 132 joins the conduit 138 which extends between the passage 108 and the conduit 132, and above the conduit 138 is located a discharge conduit 136 which also communicates with the conduit 132 and which forms an extension of the conduit 138. A flap valve 134 is located at the junction between the conduits 132, 136, and 138. In the illustrated position of the valve 134 the conduit 138 is closed at its top end so that the air which moves into the conduit 132 discharges through the conduit 136 out into the room. This latter air moves out through the louvres 137 of the cover 135, as was pointed out above in connection with FIG. 1. When the flap valve 134 is turned upwardly to the dotted line position shown in FIG. 2 so as to close the discharge conduit 136 the flap valve 110 is simultaneously moved downwardly to the dotted line position shown in FIG. 2 so as to close the tube 108, and thus in the dotted line positions of these flap valves, which is to say in the positions where they close the conduits 136 and 108 a closed circuit for the air is provided and the air will continuously circulate from the chamber 15 out through the chamber 130 and through the conduits 132, 138 and 126 back into the chamber 15. The flap valves 110 and 134 are fixedly carried by shafts which are supported for rotary movement about their axes, respectively, and these shafts extend to the exterior of the conduits where they are respectively fixed to pulleys around which a cable 133 extends. This cable 133 also cooperates with a pulley assembly driven from a motor 131. Through this pulley and cable arrangement when the motor 131 turns in one direction both of the flap valves will turn away from each other to the positions where they close the conduits 108 and 136, respectively, while when the motor 131 turns in the opposite direction these flap valves will move toward each other so as to close the conduit 138 at its upper and lower ends in the manner indicated in FIG. 2. The flap valve 134 cooperates with a pair of switches 127′ and 129′ which are connected into the circuit of the motor 131 so that when the flap valve 134 actuates the switch 129′ the circuit to the motor 131 is opened and the motor 131 stops, and also when the flap valve 134 actuates the switch 127′ the circuit of the motor 131 is also opened so that in this way the movement of the flap valves is limited between the positions described above. The indicator 42 of the instrument panel 18 (FIG. 1) indicates the positions of the flap valves 110 and 134, and this indicator 42 is also actuated from the cable 133 through an unillustrated connection.

In order to heat the air which flows through the conduit 126 into the testing chamber 15 electrical heater 111 extends across the interior of the conduit 126, and this heater is controlled through the thermostat 23 as well as through the controlling and indicating air instrument 25 which have been referred to above.

The switch 40 which is on the instrument panel at its lower left corner, as viewed in FIG. 1, controls the extent to which humidity is delivered to the air, and this switch 40 will control the number of conduits or tubes 120, 122, 124 which are opened at any one time. The cotrol of the humidity chamber 15 can be automatically regulated through the instrument 20 together with the indicating and control assembly 21, as referred to above, and as a result of the hand-operated switch 40 which enables the number of tubes 120, 122, 124 which are opened to be regulated it is possible to greatly simplify the automatic controls. The switch 145 which is directly above the automatic means 48 at the front of the apparatus can be used for manually controlling the circulation of the air either in a closed circuit or in a circuit which will draw fresh air into the chamber 15, or the change-over between the circuits can be regulated automatically in a manner described below in connection with FIG. 4. It is possible when operating on a closed circuit to increase the temperature in the testing chamber 15 by utilizing heat from the lamp 66, so that in this way a considerable economy of operation is achieved. Of course, a further increase in the temperature can be provided through the electrical heater 111 which is energized for this purpose. Moreover, by using a closed circuit together with a relatively high temperature it is possible to subject the samples to the effects of relatively high temperatures and high humidity, which is extremely important in order to simulate all weather conditions.

In the event that for certain purposes it is desired to test the samples to determine the effect of direct rainfall thereon, then the tube 140 shown at the left of the container 98 in FIG. 2 is used. This tube 140 is closed at its top end and at its portion which extends downwardly from its top end it is provided with a series of nozzles arranged in a row along the tube 140 so that water will be sprayed out of these nozzles in a manner simulating rainfall onto the various samples as they move past the tube 140 during rotation of the support means 78, and in this way it is possible to determine the results of rainfall on the samples. The water which drips from these samples is delivered to the tank 250 of FIG. 5 in the manner described above.

As was pointed out above, all of the functions of the apparatus, such as the control of the flap valves to determine the type of air circulation, the energizing and extinguishing of the lamp, the simulation of rain, the control of humidity, the control of temperature, the control of the manner in which the samples move with the carousel (with or without turning of the samples with respect to the carousel), and the raising and the lowering of the container 98 can take place either automatically through the automatic means 48 or by hand through actuation of the switches 141–146.

The details of the automatic means are illustrated schematically in FIG. 17. FIG. 17 illustrates the automatic means 48 as it appears from the rear, and FIG. 17 shows the portion of the automatic means which is located in the interior of the apparatus except when the unit 48 is withdrawn from the apparatus in the manner described above. The automatic means includes the rotary shaft 175 which is driven by a synchronous motor 176. The shaft 175 carries the plurality of control discs 170, 172, 174, 178, 180, 160, and 173 to bring about the various controls of the functions referred to above.

In addition, the shaft 175 carries the spacers 177 which maintain the several control discs at a suitable distance from each other. These control discs while made of a relatively stiff material nevertheless can be easily cut, even with a scissors, for example, so that they can be given a configuration which will provide the desired controls during rotation of these discs. The shaft 175 fixedly carries an axially extending key 179 which extends through a notch of the central opening of each control disc through which the shaft 175 extends, so that in this way these discs are keyed to the shaft 175 for rotary movement therewith, and as is apparent from the lower portion of FIG. 17 these discs cooperate with suitable switches for opening and closing the switches during rotation of the discs so as to provide the automatic controls in accordance with the configurations of the several control discs.

The operation of the apparatus is further described in connection with FIG. 4 which shows the electrical wiring of the apparatus. As is apparent from the upper left portion of FIG. 4, the closing of the main switch 24 connects the entire apparatus with the three-phase lines which includes the three phases R, S, and T, and in addition there is the ground line O. After the main switch 24 has been closed, the operator manually closes the switch 26 in order to start the operation of the apparatus, and as a result the circuit will be closed from the phase S through the switch 26 and the conductor 26a back to the ground O so that the relays 156 and 157 will be energized and in addition the motor 80 will start to operate the circuit through the motor 80 including this conductor 26a and the circuit through the switch 163 which is operated from the foot pedal 64, this latter circuit passing through the central 1 of the three switches which are closed by the energizing of the relay 157. The closing of these three switches of course energizes also the motor 188, and it is to be noted that a relay-type circuit breaker Si is also energized at this time so as to close the safety switches of the three phases of the motors 180 and 190, these switches automatically opening under overload conditions as a result of the circuit breaker operation. Of course, the motor 190 will not be energized until the relay 192 is energized. Thus, the closing of the switch 26 will start the operation of the motors 80 and 188. Therefore, the samples will start to turn around the lamp 66 and also the motor 188 will drive the fan 74 so as to draw cooling air through the tube in which the lamp 66 is housed and also the dished members which control the humidity will rotate at this time. A holding circuit 154 is provided for maintaining the circuits closed even after the operator releases the switch 26 so that the latter opens, and this circuit 154 includes the switch 30 which is actuated by the operator whenever it is desired to stop the apparatus. This switch 30 of course normally remains closed. The motor 80 operates the governor 82 so that as soon as the speed of the carousel moves above a given minimum value the switch which is controlled by the governor 82 will close, and it will be noted that this switch also is located in the holding circuit 154. Furthermore, the operation of the motor 188 draws air, through operation of the fan 74, into the tube 60 so as to deflect the valve 75 and thus close the switch 150 which is also located in the holding circuit 154. It will be noted that the holding circuit 154 also includes a switch 152 which is controlled by the relay 152, and this relay is controlled by the humidity detecting instrument 20. As soon as the latter instrument detects a given minimum humidity the switch 152 will also close, and thus when all of the switches 30, 82, 150 and 152 are closed the holding circuit will be energized so that when the operator releases the button 26 the apparatus will continue to operate. The closing of the holding circuit 154 maintains the relays 156 and 157 energized, and the energizing of the relay 156 closes the switch 156 associated therewith so as to enable current to be delivered to the lamp 66. If the relay 156 is not energized the lamp 66 cannot be energized. Moreover, the switch 156 enables the circuits to all of the various units for carrying out the various functions to be closed, so that it is only while the switch 156 is closed that the various functions referred to above can be performed by the apparatus.

Figure 4A:
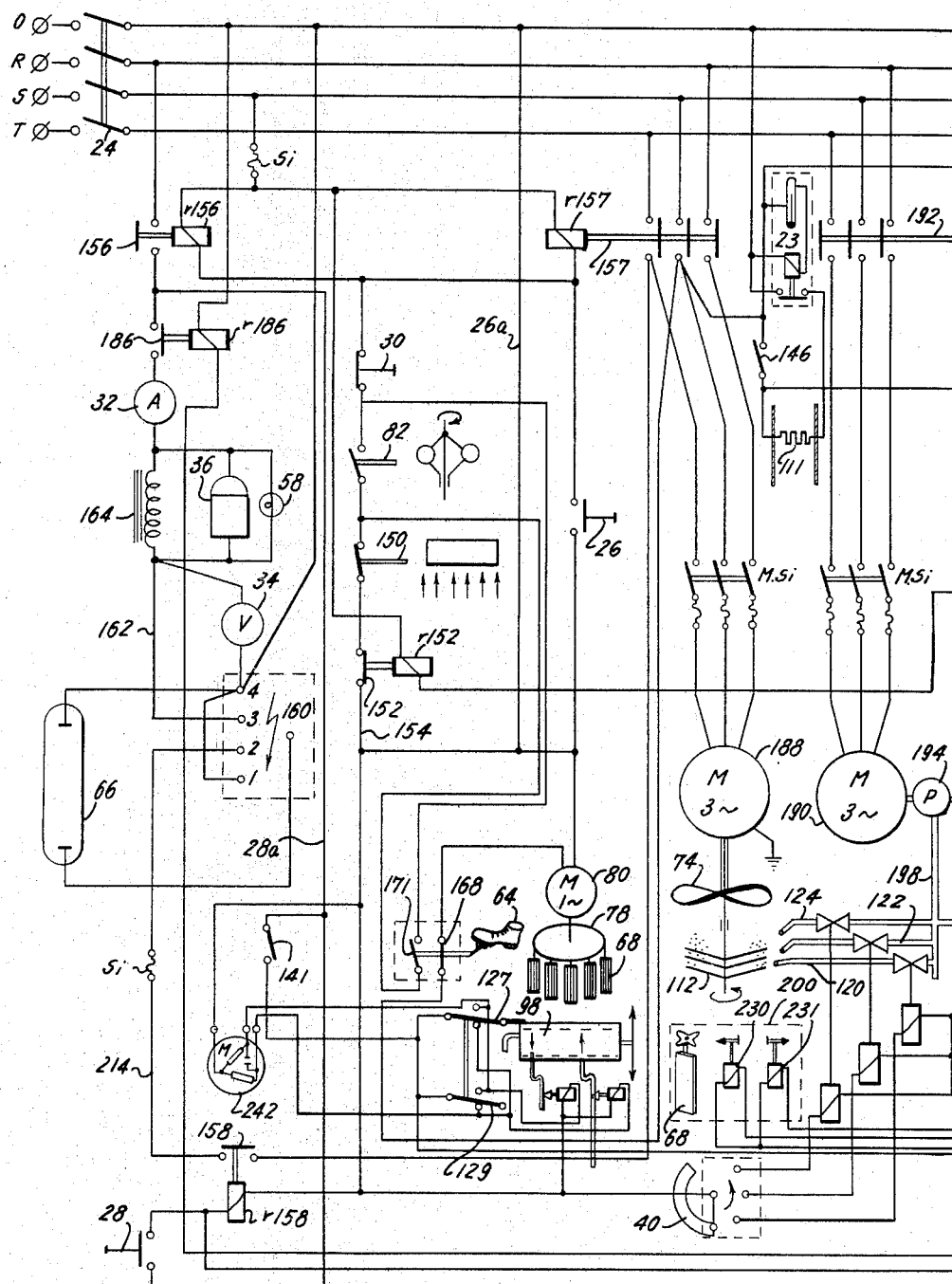
FIGS. 4a and 4b illustrate together a wiring diagram of one possible embodiment of a structure according to the present invention.
Figure 4B:
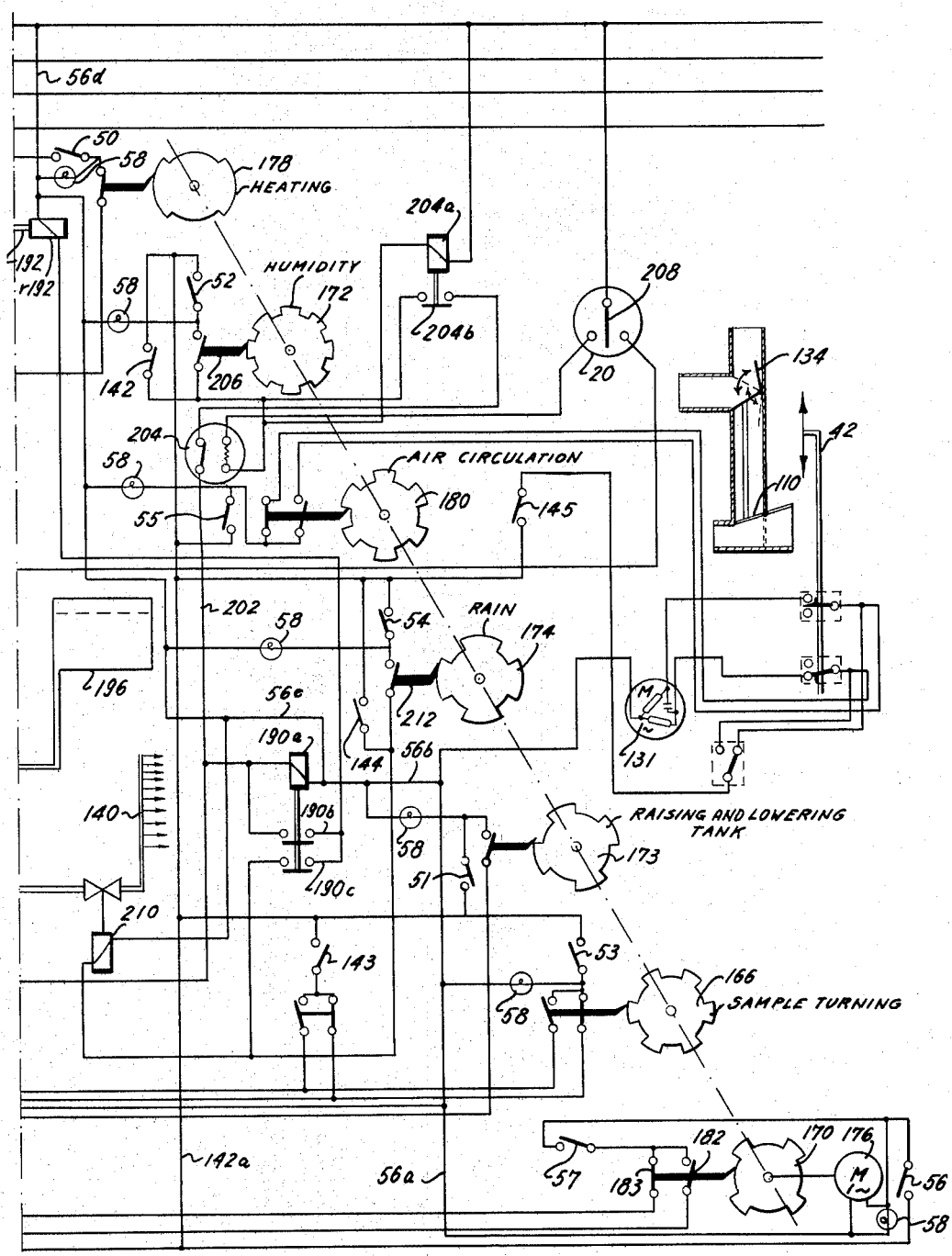

In order to energize the lamp 66, the operator will close the switch 28 shown at the lower left of FIG. 4, and the closing of this switch 28 will energize the relay 158. It is to be noted that the holding circuit 154 completes a circuit from the phase S through the various switches of the holding circuit 154 and through the conductor 26a to the ground O. Also it will be noted that the closing of the switch 28 energizes the relay 158 through the circuit which includes the switch 156, this circuit extending from the switch 156 and of course the phase R through the conductor 28a and through the switch 28 and then through the coil of the relay 158 back to the conductor 26a to the ground O. The relay 158 is a time relay which, after it is energized by the closing of the switch 28 by the operator, will after a relatively short time become deenergized so that in this way a relatively short impulse is delivered through the switch 158 to the conductor 214 for igniting the lamp 66. It will be noted that the switch 158 closes a circuit which is taken from the phase T through the left switch which is closed by the relay 157 in FIG. 4, and in this way the current is delivered to the igniting conductor 214 which delivers a relatively short impulse to the igniting assembly 160. After the automatic opening of the switch 158 as a result of the deenergizing of the relay 158 the lamp 66 will remain energized. The circuit through the lamp 66 is taken from the phase R and through the conductor 162 the current is delivered to the lamp 66 which is also connected with the ground O, so that in this way the circuit is completed through the lamp 66. The switch 186 is a normally closed switch of the relay 186, so that as long as this relay is unenergized the circuit through the lamp is completed, and the operation of the relay 186 is further described below. In order that the operator may observe the voltage and amperes of the current used for the lamp 66 the ammeter 32 and the voltmeter 34 are connected into the circuit as illustrated at the left portion of FIG. 4, and the timer 36 is also connected in the circuit in the manner illustrated so as to indicate the duration of operation of the lamp 66. In the circuit 162 of the lamp 66 is a choke coil 164, and it will be noted that the timer 36 is connected in parallel with the choke coil 164. Also, one of the signal lamps 58 is connected in parallel with the choke coil.

As was pointed out above the foot pedal 64 is provided to enable one of the samples to be removed, for example, without stopping the entire apparatus, and this is done by simply stopping the drive from the motor 80 so that the carousel will stop turning while the rest of the apparatus will continue to operate. As may be seen from FIG. 2, when the opeartor actuates the pedal 64 the switch 168 will open while the switch 171 will close. In this way even though the circuit of the motor 80 will be interrupted so that its speed will fall below that at which the switch 82 would remain closed, the closing of the switch 171 bridges the switch 82 so that all of the operations continue while the motor 80 is maintained unenergized while the foot pedal 64 is depressed, and thus the carousel will stop turning and the operator can change samples as desired at this time without interrupting the operation of the apparatus in any other way. As soon as the operator releases the pedal 64 an unillustrated spring returns the parts to the position shown in FIG. 2 where the switch 171 opens and the switch 168 closes so that the operations then continue with the motor 80 becoming energized and of course the switch 82 closes so as to maintain the circuit. It should be noted that the minimum speed at which the governor-operated switch 82 closes is relatively low so that the switch 82 closes in an extremely short period of time so that there is no interruption in the circuit. The carousel turns at a relatively slow rate of speed moving the samples slowly around the lamp 66.

As has been pointed out above in connection with FIGS. 1 and 17, the automatic means 48 is capable of providing automatic programs of operation through the several programming discs 170, 172, 174, 178, 180, 166, and 173, and the motor 176 which turns these control discs is energized by the switch 56. As is shown at the lower right of FIG. 4 one of the signal lamps 58 will be energized when the switch 56 is closed so as to indicate that the motor 176 is operating. The circuit from the phase R passes through the switch 156 and from a point immediately below the switch 156 to the conductor 28a and from the latter to the lowermost conductor shown in FIG. 4 through the switch 56 and then through the lamp 58 at the lower right portion of FIG. 4 to the conductor 56a, and it will be noted that the motor 176 is connected in parallel with this signal lamp 58. The conductor 56a is connected to the condutcor 56b which in turn is connected to the conductor 56c, and finally this conductor 56c is connected to the conductor 56d which is connected to the ground O, so that in this way the closing of the switch 56 completes the circuit through the motor and starts operation of the automatic means 48. The several functions are provided automatically by connections with these several conductors 56a–56d.

In order to provide for automatic operation of the lamp 66, the operator will close the switch 57 of the automatic means 48, this switch 57 being shown at the lower right portion of FIG. 4. Thus, this switch 57 when closed will place the circuit from the phase R through the switch 156 and the conductor 28a in connection with the switches 182 and 183 which are operated by the programming disc 170. It will be noted that the switch 183 is in the circuit of the relay 186. Thus, when the disc 170 is in a position closing the switch 183 and opening the switch 182 the relay 186 will be energized and thus the switch 186 will open so that the lamp will be extinguished. It should be noted that the disc 170 turns at a relatively slow rate so that when the switch 183 is closed in order to extinguish the lamp 66 according to the automatic programming provided by the disc 170 the lamp will remain extinguished for a substantial period of time on the order of a half-hour, for example, so that when the lamp is subsequently again energized there will be no difficulty in energizing of the lamp because of an attempt to energize it within a relatively short time after it has been extinguished. When a projecting of the disc 170 reaches the switch controlling member in order to close the switch 182 and open the switch 183, the circuit will be completed through the relay 158 so as to provide a short impulse through the igniting conductor 214 to the ignition assembly 160 of the lamp 66 and the lamp 66 will now be ignited and will remain ignited as long as the programming disc 170 maintains the switch 182 closed and the switch 183 opened. After the disc 170 turns sufficiently to again close the switch 183 and open the switch 182 the lamp will become again extinguished, and in this way the lamp can be turned on and off in an automatic manner by the automatic structure.

The structures for controlling the humidity and for providing the spray which simulates rain require the operation of the motor 190. This motor 190, when it operates, drives a pump 194 which pumps liquid from a reservoir 196 into the conduit 198. From the conduit 198 shown at the lower central portion of FIG. 4 the liquid can be delivered either to the three tubes which cooperate with the rotary dished members which are rotated by the motor 188 which runs at all times, as long as the apparatus is operating, or the liquid can be delivered from the conduit 198 to the pipe 140 when the solenoid valve 210 is energized so as to open the conduit 140. In the same way, the several tubes used to deliver droplets of water to the rotary dished members are respectively provided with solenoid valves 200 which are closed upon actuation of the switch 40 shown at the lower part of FIG. 4. This switch 40 has an arcuate switch-closing member which, when the switch 40 is turned in a counterclockwise direction from the position shown in FIG. 4, will first energize the lowermost valve so as to open the tube 120, and if the switch 40 is turned into its second position it will maintain the lowermost valve open while opening the intermediate valve so as to open the intermediate tube 122, and the operator may turn the switch 40 to its final position energizing all three valves and opening all three of the tubes, so that in this way the operator has the choice of controlling the rate of delivery of liquid to the air so as to control the intensity of the humidification of the air.

The motor 190 will of course operate only when the relay 192 shown at the upper central part of FIG. 4 is energized, since the energizing of this relay will close the circuits between the motor 190 and the three phases R, S, T. The energizing of the relay 192 depends upon the energizing of the relay 190a, since when this latter relay 190a is energized the switches 190b and 190c will be closed thereby, and the circuit for the relay 192 must go through one of these switches 190b and 190c, the switch 190c coming into play when the control for rain is operated while the switch 190b comes into play when the control for humidity is operated.

The energizing of the relay 190a is in turn dependent upon the gas pressure relay 204 which includes the relay coil 204a and the switch 204b which is closed when the relay coil 204a is energized, and the gas pressure relay 204 in addition depends for its operation on the detection of the instrument 20 of a humidity within a predetermined range. As has already been pointed out, as long as there is a certain minimum humdiity the circuit will go from the phase R through the switch 156 and through the relay 152 to the instrument 20. This instrument is of course connected to the ground O and in addition there is a circuit branching from the instrument 20 to the gas pressure relay 204. This latter circuit extends between the instrument 20 and ground O and energizes the relay coil 204a so as to maintain the switch 204b closed.

If it is assumed now that the operator wishes to increase the humidity in the testing chamber 15, the operator will close the switch 142, assuming that the control is to be manual and not automatic. The closing of the switch 142 will complete a circuit through the relay coil 190a. Thus, from the phase R the circuit will pass through the switch 156 and along the conductor 28a to the lowermost conductor shown in FIG. 4, and from the latter through the conductor 142a through the switch 142 and then through the switch 204b from where the circuit passes through the switch diagrammatically shown at the left part of the relay 204, and in this way the circuit passes along the conductor 202 to the relay coil 190a which is connected to the ground through the conductors 56c and 56d. Thus, the closing of the switch 142 for manual control of the humidity will result in energizing of the relay 190a as well as in the consequent closing of the switches 190b and 190c. As soon as the switch 190b closes the circuit from the conductor 202 also passes around the coil 190a through the switch 190b and then through the coil of relay 192 along the conductor 56d to the ground O, so that the relay 192 becomes energized and the motor 190 starts to operate.

The operator will have, before closing are switch 142, placed the switch 40 in a selected position in accordance with the tubes 120, 122, and 124 which are to be opened, and the circuit from the phase R which passes through the switch 142 and along the conductor 202 in the manner described above branches from the conductor 202 through the selected solenoid valves of the tubes 120, 122, 124 and through the switch 40 back to ground O through the conductor 26a, so that in this way liquid is delivered to selected dished members to provide a given degree of humidity.

In the event that the humidity is to be automatically controlled, the operator will instead close the switch 52 of the automatic means 48, while the switch 142 will remain open, and the same operations will take place except that the circuit will now pass from the conductor 142a through the switch 52 and through the switch 206 whenever the latter is closed by the disc 172, so that in this way the disc 172 which is turned from the motor 176 will control the humidity circuit.

Assuming that it is desired to provide simulation of rain with a manual control, the operator will close the switch 144 and the circuit from the phase R will also pass through the switch 156, the conductor 28a, the lowermost conductor shown in FIG. 4, the conductor 142a, and the switch 144 on the one hand through the switch 190c so as to energize the relay 192 and actuate the motor 190 and also on the other hand through the solenoid valve 210 which is also connected to ground O through the conductors 56c and 56d, so that in this way the rain simulation is provided. In the event that automatic control of rain is desired the operator will close the switch 54, and the rotating disc 174 will close and open the switch 212 so as to turn the delivery of the spray from the tube 140 on and off in accordance with the configuration of the disc 174.

The energizing of the heater 111 can be manually controlled through the switch 146. As was pointed out above whenever the apparatus operates the relay 157 is energized, and the central switch which is closed by this relay connects the phase S with the circuit which includes the switch 146 and the heater 111. The thermostat 23 is also connected in this way to the phase S, and when the thermostat operates in a given range a relay-controlled switch illustrated diagrammatically for this thermostat 23 in FIG. 4 will be closed so as to connect the heater 111 to the ground O in the manner shown in FIG. 4. Thus, the simple closing of the switch 146 by the operator will complete a circuit from the phase S through the heater 111 to ground, and in this way the heater 111 can be maintained manually energized for as long as desired. The rotary control disc 178 can be used to provide the automatic energizing of the heater 111. In order to provide for automatic control of the heater 111 the operator will close the switch 50, and then the switch which is closed and opened by the disc 178 will control the energizing and deenergizing of the heater 111. The circuit at this time will extend from the phase S through the switch 50 and the switch which is opened and closed by the disc 178 to the heater 111 which is connected to ground O through the relay switch controlled by the thermostat 23.

In order to provide for a manual change-over between a closed air circuit and an open air circuit the operator will change the position of the switch 42. However, in order to provide for this manual change-over the operator will also close the switch 145. As may be seen from FIG. 4 the circuit through the switch 145 is derived from the conductor 142a which is in turn connected to the phase R through the switch 156 as described above. From the switch 145 the circuit passes through the motor 131 and from the latter to ground O through the conductors 56b, 56c and 56d, and depending upon the position to which the operator moves the switch 42 the motor 31 will operate in one direction or the other so as to change the positions of the flaps 110 and 134 in the manner described above.

It is also possible to provide automatically change-overs between closed and open circulation of the air, and this is done by closing the switch 55 which is also connected to the conductor 142a so that this switch receives its current in the same way as the switch 145. However, connected in series with the switch 55 are a pair of switches which are alternately opened and closed by the rotary control disc 180 which is driven from the motor 176, and these switches which are controlled by the disc 180 are electrically connected to the motor 131 so as to operate the latter first in one direction and then in the other direction in accordance with the movement of the switches by the disc 180 so that in this way the flaps 110 and 134 will alternately move between their positions providing open and closed circulation.

The raising and lowering of the container 98 is brought about by the motor 242, in the manner described above, and this motor 242 is shown at the lower left portion of FIG. 4 just above the switch 158. In order to provide manual control of the raising and lowering of the container 98 the operator will close the switch 141 shown also at the lower left portion of FIG. 4. In this case the circuit will pass from the phase R through the switch 156 and the conductor 28a to the switch 141, and from the latter through one or the other of the switches 127 and 129, depending upon the position of the container 98, and then through the motor 242 to ground O through the conductor 26a. Thus, the simple closing of the switch 141 will result in movement of the container 98 either from its lower to its upper position or from its upper to its lower position.

The tank 98 can also be automatically moved periodically between its upper and lower positions, and this is brought about by the control disc 173 which is turned by the motor 176. In order to provide for automatic movement of the container 98 the operator will close the switch 51. As may be seen from FIG. 4 the switch 51 is connected to the conductor 142a which is connected to the phase R through the switch 156 in the manner described above. Connected in series with the switch 51 is a switch which is opened and closed by the control disc 173 during turning of the latter, and this latter switch is connected to the switches 127 and 129 so that depending upon the position of the container 98 whenever the switch which is operated by the disc 173 is closed the container 98 will move to its other position since the motor 242 will be energized and the circuit will pass from the phase R through the switch 51 and this switch which is controlled by the disc 173 and then through one of the switches 127 or 129 and through the motor 242 to ground through the conductor 26a.

The change-over between rotary movement of the samples without turning of the samples with respect to the rotary support means and with turning of the samples with respect to the rotary support means can be brought about with the structure described above and shown in FIGS. 12–14. In order to change-over from one to the other of these types of operation in a manual manner the operator will close the switch 143, and this switch derives its current also from the conductor 142a which is connected to the phase R through the switch 156 in the manner described above. The closing of the switch 143 will energize one or the other of the solenoids 230 or 231 in the manner shown diagrammatically in FIG. 4, and these solenoids are connected to the ground through the conductors 56a, 56b, 56c and 56d, so that depending upon the position of the carriage 221, when the switch 143 is closed this carriage will be moved to its other position and the type of operation of the samples will be changed.

It is also possible to provide periodic automatic changing between turning of the samples around the lamp with or without turning of the samples with respect to the carousel, and this is brought about by closing the switch 53 so as to connect into the circuit one or the other of the switches which are alternately closed and opened by the rotary disc 166 which is driven by the motor 176. These latter switches are connected to the solenoid coils 230 and 231 in the manner shown in FIG. 4, so that in this way it is possible to provide periodic automatic changing of the manner of operation of the sample-carriers.

It is apparent that with the above-described structure of the invention it is possible to subject the samples to various types of relatively intense tests which closely simulate weather conditions. It should be noted that when a relatively high degree of humidity is maintained in chamber 15 it is possible to turn off the lamp 66 as well as to allow the temperature to drop in the chamber so that there will be deposited on the samples a relatively heavy condensation closely simulating the effects of dew.

It will be understood that each of the elements described above, or two or more together, may also find a useful application in other types of testing apparatus different from the types described above.

While the invention has been illustrated and described as embodied in weather-simulating testing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a testing apparatus, in combination, a rotary carousel turnable about a given axis; a light source located on said axis; a plurality of carriers carried by said carousel for turning movement therewith and distributed about said light source, said carousel supporting each of said carriers for turning movement about an axis parallel to the axis of turning of said carousel, and said carriers being adapted to carry samples to be tested so that the latter will be moved around the light source during turning of said carousel around the axis at which the light source is located; a star member fixed to each carrier for turning movement therewith with respect to said carousel and having a plurality of fingers projecting from the turning axis of each carrier with respect to said carousel; a projection located in the path of turning movement of said star members during turning of said carriers with said carousel around the light source so that said projection will engage a finger of each star member to cause the latter to turn with respect to said carousel during movement of the star member past the projection whereby the carriers will be turned about their axes of turning with respect to said carousel as they move past said projection; and means cooperating with each star member for preventing turning of the same with respect to said carousel when all fingers of the respective star member are out of arrangement with said projection.

2. In a testing apparatus, in combination, a stationary member having a circular periphery and formed with a cutout at a part of its periphery; a control member located in said cutout and having one position where an edge of said control member forms a continuation of the periphery of said stationary member and another position where a projection of said control member projects outwardly beyond said periphery of said stationary member; a carousel turnable about the axis of the circular periphery of said stationary member; a light source located at said axis; a plurality of carriers distributed about said light source and adapted to carry samples which are to be tested, said carriers being carried by said carousel for movement therewith about said light source as well as for turning movement with respect to said carousel respectively about axes which are parallel to the axis at which said light source is located; and a plurality of star members respectively fixed to said carriers and located at the elevation of and closely adjacent to the circular periphery of said stationary member, said circular periphery cooperating with said star members to prevent turning of said star members with respect to said carousel so that said carriers are compelled to turn with said carousel only around the axis where said light source is located, and said control member when in a position where it forms a continuation of the periphery of said stationary member preventing turning of said carriers even when they move past said cutout of said stationary member, said control member when in the position where said projection thereof projects beyond said periphery of said stationary member engaging each star member to turn the latter while the carousel turns with respect to said stationary member whereby the carriers will then be turned with respect to said carousel so as to expose different portions of said carriers to said light source during successive revolutions of said carousel.

3. In a testing apparatus, in combination, a light source; a plurality of carriers arranged within an annular space about said light source and adapted to carry samples which are to be tested; support means from which said carriers are suspended within said annular space; an annular container having an annular shape equal to the shape of said annular space within which said carriers are arranged and having an open top and having a rest position located beneath said annular space and said carriers arranged within the same, said light source being located on an axis about which said container extends and substantially on the level of said carriers, and the depth of said container being equal at least approximately to the height of said carriers; and means operatively connected to said container for raising the same along said axis from said rest position to a position where said container is located within said annular space and surrounds said light source with said carriers located in said container and for lowering said container back to said rest position thereof, whereby the carriers may be immersed in a liquid located in said container to determine the influence of the liquid on samples carried by said carriers.

4. In a testing apparatus, in combination, a light source; a plurality of sample-carriers distributed about said light source; rotary support means carrying said carriers for moving the latter about an axis extending through said light source so that the carriers move around said light source during rotary movement of said support means, said carriers being adapted to carry samples to be tested, and said support means supporting each carrier for movement with respect to said support means about an axis parallel to the axis around which said carriers move during rotary movement of said support means; a plurality of star members respectively fixed to said carriers for turning movement therewith with respect to said support means; a projection having an inoperative position spaced from the path of movement of said star members and an operative position in said path of movement for engaging said star members to turn the latter and said carriers therewith with respect to said support means during rotary movement thereof; and electrical means operatively connected to said projection and selectively operable by the operator for placing said projection either in said operative or in said inoperative position thereof.

5. In a testing apparatus, in combination, a light source; a plurality of carriers distributed about said light source and adapted to carry samples which are to be tested; support means from which said carriers are suspended; an annular container having an open top and having a rest position located beneath said carriers, said light source being located on an axis about which said container extends, and the depth of said container being equal at least approximately to the height of said carriers; and means operatively connected to said container for raising the same along said axis from said rest position to a position where said container surrounds said light source with said carriers located in said container and for lowering said container back to said rest position thereof, whereby the carriers may be immersed in a liquid located in said container to determine the influence of the liquid on samples carried by said carriers, said means for raising said container including a plurality of lifting screws distributed about the outer surface of said annular container, each turnable about an axis substantially parallel to the axis of said annular container and operatively connected to the latter for moving the same from said rest to the raised position during turning of said screws in one direction and from said raised to said rest position during turning of said screws in opposite direction, and common drive means operatively connected to said lifting screws for simultaneously driving the same in a selected direction.

6. In a testing apparatus as recited in claim 5, said common drive means including a pinion fixed to each of said lifting screws, a common gear ring having an axis coinciding with the axis of said annular container and meshing with said pinions, electric motor means operatively connected to said gear ring for turning the same about its axis, and control means cooperating with said container for stopping said motor means when said container during its movement from said rest to said raised position reaches said raised position and when said container during its movement from said raised to said rest position reaches the latter.

7. In a testing apparatus, in combination, a light source; a plurality of carriers distributed about said light source and adapted to carry samples which are to be tested; support means from which said carriers are suspended; an annular container having an open top and having a rest position located beneath said carriers, said light source being located on an axis about which said annular container extends, and the depth of said annular container being equal at least approximately to the height of said carriers; means operatively connected to said annular container for raising the same along said axis from said rest position to a position where said annular container surrounds said light source with said carriers located in said annular container and for lowering said annular container back to said rest position thereof, whereby the carriers may be immersed in a liquid located in said annular container to determine the influence of the liquid on samples carried by said carrier; an additional substantially closed container; conduit means providing communication between said annular container and said closed container; combined pump and valve means cooperating with said conduit means for transferring the liquid from said closed container to said annular container and vice versa; and control means cooperating with said annular container and controlling said combined pump and valve means for transferring liquid from said closed container into said annular container when the latter is in said raised position and for transferring liquid from said annular container to said closed container when said annular container is in said rest position.

References Cited by the Examiner
UNITED STATES PATENTS

| | | | |
|---|---|---|---|
| 1,582,992 | 5/1926 | Loepsinger | 239—224 |
| 1,675,802 | 7/1928 | Hamilton | 73—45.5 |
| 1,827,530 | 10/1931 | Le Grand. | |
| 1,969,606 | 8/1934 | Hall | 73—150 |
| 2,434,450 | 1/1948 | Williford | 73—150 |
| 2,640,354 | 6/1953 | Bernegger | 73—159 |
| 2,804,770 | 9/1957 | Gunther et al. | 73—150 |
| 2,987,914 | 6/1961 | Gunther et al. | 73—150 |

RICHARD C. QUEISSER, *Primary Examiner.*